United States Patent
Sakamoto et al.

(10) Patent No.: US 9,643,156 B2
(45) Date of Patent: May 9, 2017

(54) OXYGEN-ABSORBING FILM, OXYGEN-ABSORBING LAMINATE, OXYGEN-ABSORBING PACKAGING MATERIAL COMPRISING OXYGEN-ABSORBING LAMINATE, AND OXYGEN-ABSORBING RESIN COMPOSITION

(75) Inventors: Natsuki Sakamoto, Bunkyo-ku (JP); Tatsuya Ogawa, Bunkyo-ku (JP)

(73) Assignee: KYODO PRINTING CO., LTD., Tokyo (JP)

(*) Notice: Subject to any disclaimer, the term of this patent is extended or adjusted under 35 U.S.C. 154(b) by 691 days.

(21) Appl. No.: 13/982,898

(22) PCT Filed: Sep. 23, 2011

(86) PCT No.: PCT/JP2011/071742
§ 371 (c)(1),
(2), (4) Date: Jul. 31, 2013

(87) PCT Pub. No.: WO2012/105082
PCT Pub. Date: Aug. 9, 2012

(65) Prior Publication Data
US 2013/0310252 A1    Nov. 21, 2013

(30) Foreign Application Priority Data
Feb. 1, 2011   (JP) .................................. 2011-020262

(51) Int. Cl.
*B01J 20/26* (2006.01)
*B32B 27/18* (2006.01)
*B32B 27/08* (2006.01)

(52) U.S. Cl.
CPC .............. *B01J 20/26* (2013.01); *B32B 27/08* (2013.01); *B32B 27/18* (2013.01);
(Continued)

(58) Field of Classification Search
CPC .......... B01J 20/26; B32B 27/08; B32B 27/18; B32B 2439/70; B32B 2439/80; B32B 2307/7244; B32B 2264/102
(Continued)

(56) References Cited

U.S. PATENT DOCUMENTS

2009/0246556 A1* 10/2009 Senoo .................. A23L 3/3436
428/702

FOREIGN PATENT DOCUMENTS

JP    1-268742 A    10/1989
JP    7-119329 B2   12/1995
(Continued)

OTHER PUBLICATIONS

Introduction to Forming Inflation Films; publication by Nippon Polyolefin Film Industry Association, Tokyo, Japan, production by Oval Corporation; 3 pages (2008).
(Continued)

*Primary Examiner* — Colleen Dunn
*Assistant Examiner* — Haytham Soliman
(74) *Attorney, Agent, or Firm* — Sughrue Mion, PLLC

(57) ABSTRACT

An oxygen-absorbing film (1) is composed of an oxygen-absorbing layer (2) and thermoplastic resin layers (3) provided on both surface of the oxygen-absorbing layer (2), wherein the oxygen-absorbing layer (2) comprises both a thermoplastic resin and an oxygen-deficient cerium oxide, and the content of the oxygen-deficient cerium oxide exceeds 50 wt % and is less than 85 wt %. The oxygen-absorbing layer is formed preferably from a resin composition which contains an oxygen-deficient cerium oxide in an amount exceeding 50 wt % and which exhibits a melt flow rate of 1.0 to 18.0 g/10 min.

12 Claims, 1 Drawing Sheet

(52) U.S. Cl.
    CPC . *B32B 2264/102* (2013.01); *B32B 2307/7244* (2013.01); *B32B 2439/70* (2013.01); *B32B 2439/80* (2013.01)

(58) Field of Classification Search
    USPC .......... 502/402; 428/702; 252/194; 206/557
    See application file for complete search history.

(56) References Cited

FOREIGN PATENT DOCUMENTS

| | | | |
|---|---|---|---|
| JP | 8-41254 | A | 2/1996 |
| JP | 10-219042 | A | 8/1998 |
| JP | 2003192908 | A | 7/2003 |
| JP | 2004-115663 | A | 4/2004 |
| JP | 2005-105194 | A | 4/2005 |
| JP | 2005280188 | A | 10/2005 |
| JP | 2006-130717 | A | 5/2006 |
| JP | 2006-131242 | A | 5/2006 |
| JP | 2010-089280 | A | 4/2010 |
| JP | 2010-99875 | A | 5/2010 |

OTHER PUBLICATIONS

"Plastics-Determination of the melt mass-flow rate (MFR) and the melt volume-flow rate (MVR) of thermoplastics," Japanese Industrial Standard JIS K7210-1999, Investigated by Japanese Industrial Standards Committee; Published by Japanese Standards Association; Oct. 20, 1999; 24 total pages.

* cited by examiner

OXYGEN-ABSORBING FILM, OXYGEN-ABSORBING LAMINATE, OXYGEN-ABSORBING PACKAGING MATERIAL COMPRISING OXYGEN-ABSORBING LAMINATE, AND OXYGEN-ABSORBING RESIN COMPOSITION

CROSS REFERENCE TO RELATED APPLICATIONS

This is a National Stage of International Application No. PCT/JP2011/071742, filed Sep. 23, 2011 (claiming priority from Japanese Patent Application No. 2011-020262, filed Feb. 1, 2011), the contents of which are incorporated herein by reference in their entirety.

TECHNICAL FIELD

The present invention relates to an oxygen-absorbing film, an oxygen-absorbing laminate, an oxygen-absorbing packaging material comprising the oxygen-absorbing laminate, and an oxygen-absorbing resin composition, which are suitably used as a packaging material of a food product, a drug, a pharmaceutical, a cosmetic product, an electronic component or the like.

BACKGROUND ART

An oxygen absorber is contained in the packages of food products and drugs as well as cosmetic products, electronic components and the like. The purpose thereof is to prevent oxygen remaining in or gradually permeating into the packages from altering the effective ingredient, flavor or color tone of the respective products to markedly deteriorate their commercial values.

Conventionally, an oxygen absorber comprising iron powder as a main reactant or a substance which is easily oxidized, such as ascorbic acid or gallic acid, is allowed to coexist as an antioxidant in the packages.

Patent Documents 1 to 3 propose a resin composition with an oxygen-absorbing capacity comprising an oxygen-deficient inorganic oxide and a thermoplastic resin, or a laminate for packaging comprising a layer formed from the resin composition with an oxygen-absorbing capacity.

The resin compositions that are concretely disclosed in Patent Documents 1 to 3 contain at most 65 parts by weight of an oxygen-deficient cerium oxide with respect to 100 parts by weight of the thermoplastic resin (39.4% by weight of an oxygen-deficient cerium oxide in the resin composition).

However, Patent Documents 1 to 3 do not concretely disclose a resin composition with an oxygen-absorbing capacity comprising an oxygen-deficient inorganic oxide in an amount of more than 50% by weight or a laminate comprising an oxygen-absorbing layer composed of the resin composition.

With regard to the reason for controlling the content of the oxygen-deficient inorganic oxide in the resin composition with an oxygen-absorbing capacity or the oxygen-absorbing layer to be 50% by weight or less, Patent Documents 2 and 3 disclose that, when the content of oxygen-deficient cerium oxide is higher than 50% by weight, the oxygen-absorbing layer may become fragile and the strength of the laminate for packaging may thus not be maintained.

PRIOR ART DOCUMENTS

Patent Documents

Patent Document 1: JP 2005-105194A
Patent Document 2: JP 2006-130717A
Patent Document 3: JP 2006-131242A

SUMMARY OF THE INVENTION

Problems to be Solved by the Invention

However, the laminates disclosed in Patent Documents 1 to 3 comprising an oxygen-absorbing layer have a low amount of oxygen absorption. Therefore, there is a demand for a laminate having a superior oxygen-absorbing capacity.

An object of the present invention is to provide an oxygen-absorbing film having an improved oxygen-absorbing capacity; an oxygen-absorbing laminate comprising the oxygen-absorbing film; an oxygen-absorbing packaging material composed of the oxygen-absorbing laminate; and a resin composition useful for forming an oxygen-absorbing film.

When the present inventors produced resin compositions having varying amounts of an oxygen-deficient cerium oxide using a thermoplastic resin which is generally recommended for forming a film by a resin manufacturer and tried to prepare a film from the thus obtained resin compositions an increased amounts of the oxygen-deficient cerium oxide made the film formation difficult. In particular, when the content of the oxygen-deficient cerium oxide was higher than 50% by weight, an oxygen-absorbing film could not be obtained.

However, the present inventors discovered that a resin composition having a high fluidity can be formed as a film, even if the resulting resin composition contains a large amount of an oxygen-deficient cerium oxide, and thus the present invention has been completed.

Means for Solving the Problems

The oxygen-absorbing film according to the present invention is characterized in that the film is constituted by an oxygen-absorbing layer comprising a thermoplastic resin and an oxygen-deficient cerium oxide, and resin layers arranged on both sides of the oxygen-absorbing layer, wherein the content of the oxygen-deficient cerium oxide is in the range of higher than 50% by weight to less than 85% by weight.

The oxygen-absorbing packaging material according to the present invention is an oxygen-absorbing laminate in which a gas barrier film and/or a base film is/are laminated to the above-described oxygen-absorbing film, or a bag composed of the oxygen-absorbing laminate.

Further, the present invention provides a resin composition useful for forming an oxygen-absorbing film, comprising a thermoplastic resin and more than 50% by weight of an oxygen-deficient cerium oxide, and having a melt flow rate of 1.0 to 18.0 g/10 min.

Effects of the Invention

The oxygen-absorbing film according to the present invention comprises an oxygen-deficient cerium oxide in an oxygen-absorbing layer in an amount of more than 50% by weight and thus has a high oxygen-absorbing capacity.

Since the oxygen-absorbing laminate and the oxygen-absorbing packaging material according to the present invention have a high oxygen-absorbing capacity; therefore, these can prevent a deterioration of a packed content caused by oxygen degradation.

Since the resin composition according to the present invention has a fluidity and a molding strength that are suitable for film formation and contains a large amount of an oxygen-deficient cerium oxide, a packaging material having a high oxygen-absorbing capacity can be formed therefrom.

MODE FOR CARRYING OUT THE INVENTION

The embodiments of the present invention will now be described as follows.

Embodiment 1

Figure 1:
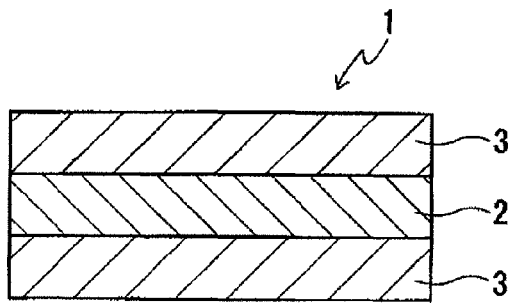
FIG. 1 is a schematic cross-sectional view illustrating the oxygen-absorbing film according to Embodiment 1 of the present invention.

As illustrated in FIG. 1, an oxygen-absorbing film 1 is constituted by an oxygen-absorbing layer 2 and resin layers 3 arranged on both sides of the oxygen-absorbing layer. The oxygen-absorbing layer 2 is composed of a thermoplastic resin and an oxygen-deficient cerium oxide and the amount of the oxygen-deficient cerium oxide contained in the oxygen-absorbing layer 2 is in the range of more than 50% by weight to less than 85% by weight. The amount of the oxygen-deficient cerium oxide contained in the oxygen-absorbing layer is preferably in the range of 51% by weight to 82% by weight.

The oxygen-absorbing film 1 having the above-described constitution can be obtained by arranging the resin layers 3 on both sides of an intermediate layer which is composed of a resin composition with a melt flow rate of 1.0 to 18.0 g/10 min, comprising an oxygen-deficient cerium oxide in an amount of more than 50% by weight. The resin layers 3 are provided for protecting the intermediate layer (i.e., the oxygen-absorbing layer 2) and improving the strength of the oxygen-absorbing film 1.

The oxygen-absorbing film 1 may be formed as a multi-film having a three-layer structure by arranging the resin layers 3 on both sides of the oxygen-absorbing layer 2 using, for example, a multilayer inflation apparatus.

The melt flow rate is an index of fluidity of a resin or a resin composition, which is prescribed in JIS K7210. In the present invention, the melt flow rate is measured at a temperature of 190° C.

The resin composition comprises a thermoplastic resin and more than 50% by weight of an oxygen-deficient cerium oxide, and has a melt flow rate of 1.0 to 18.0 g/10 min. The melt flow rate of the resin composition is preferably in the range of 1.81 to 17.27 g/10 min.

The term "oxygen-deficient cerium oxide" refers to a substance obtained by heating cerium oxide in a reducing gas such as hydrogen, carbon monoxide or acetylene, wherein the substance has a structure similar to that of a fluorite and is represented by the formula $CeO_{2-x}$. The value of x, which represents the degree of oxygen deficiency, is in the range of larger than 0 to not larger than 1. When x is larger than 1, the oxygen-deficient cerium oxide cannot maintain its crystal structure, which is not preferred.

With a resin composition which comprises such an oxygen-deficient cerium oxide (hereinafter, simply referred to as "cerium oxide") in an amount of more than 50% by weight and has a melt flow rate outside of the above-described range, a film cannot be formed.

In order to control the melt flow rate of a resin composition comprising more than 50% by weight of cerium oxide in the above-described range, it is required that the resin composition be produced by kneading a thermoplastic resin having a melt flow rate of higher than 8.0 g/10 min with cerium oxide. The melt flow rate of the thermoplastic resin is preferably in the range of 8.2 to 55.0 g/10 min, more preferably 8.4 to 54.2/10 min.

When a thermoplastic resin having a melt flow rate below the lower limit of the above-described range is used, the melt flow rate of the resulting resin composition becomes excessively low. Thus, the resin composition leads to such problems that the torque load applied on a kneader is increased and the kneader is thereby stalled; therefore, such a thermoplastic resin is not preferred. On the other hand, when a thermoplastic resin having a melt flow rate higher than the upper limit of the above-described range is used, the melt flow rate of the resulting resin composition becomes excessively high and this makes the formation of a film difficult due to inconsistent extrusion amount and breakage of the resulting film during the formation; therefore, such a thermoplastic resin is also not preferred.

Examples of the thermoplastic resin include polyethylene-based resins such as linear low-density polyethylenes (LLDPE), low-density polyethylenes (LDPE), medium-density polyethylenes (MDPE) and high-density polyethylenes (HDPE). When producing the resin composition, a material having a melt flow rate in the above-described range can be selected from these thermoplastic resins.

The resin composition can be obtained by blending cerium oxide into a selected thermoplastic resin in an amount of more than 50% by weight and then kneading the resulting mixture. The kneading can be carried out by using a mixer or an extruder, such as a single screw extruder or a twin-screw extruder.

In the resin composition having a melt flow rate of 1.0 to 18.0 g/10 min, although an oxygen-deficient cerium oxide can be incorporated in an amount of more than 50% by weight, the upper limit of the amount is less than 85% by weight. When an oxygen-deficient cerium oxide is incorporated in an amount of 85% by weight or more, the melt flow rate of the resulting resin composition is reduced below the lower limit of the above-described range, which is not preferred.

By using a resin composition having a melt flow rate of 1.0 to 18.0 g/10 min as the intermediate layer and arranging the resin layers 3 on both sides of the intermediate layer, an oxygen-absorbing film in which the oxygen-absorbing layer 2 has a thickness of 10 to 140 can be formed.

The resin layers 3 arranged on both sides of the oxygen-absorbing layer may be formed by using the same thermoplastic resin for both sides or selecting thermoplastic resins having different components. The melt flow rate of the thermoplastic resin of the resin layers 3 can be selected from the films recommended by the resin manufacturer for forming a film. Specifically, a thermoplastic resin having a melt flow rate of 0.3 to 8.0 g/10 min may be used, and a polyethylene-based resin having a heat-sealing property is preferred.

As described above, in the present invention, since the oxygen-absorbing layer 2 comprises cerium oxide in an amount of more than 50% by weight to less than 85% by weight, a higher oxygen-absorbing capacity per unit area is attained than that of a conventional film with the same thickness. In addition, since the oxygen-absorbing layer 2 is formed from a resin composition having sufficient film-forming characteristics, an oxygen-absorbing film having an oxygen-absorbing layer of 10 to 140 μm in thickness can be obtained. That is, since the oxygen-absorbing layer can be made thin, for example, even when a sealant layer or the like is added to the oxygen-absorbing film, the total thickness thereof does not become excessively large. Therefore, the oxygen-absorbing film can be freely formed or further processed.

Embodiment 2

Embodiment 2 of the present invention provides an oxygen-absorbing laminate 4 in which a gas barrier film 5 and/or a base film 6 is/are laminated to the oxygen-absorbing film 1.

Figure 2:
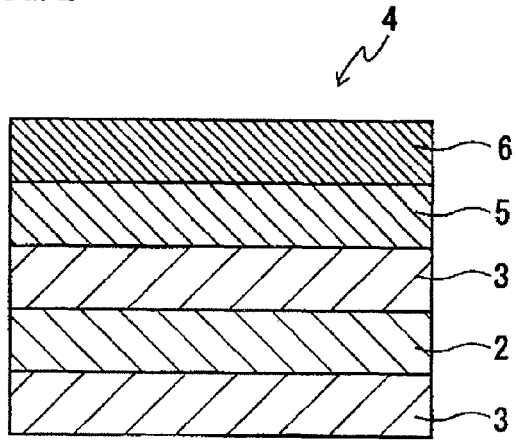
FIG. 2 is a schematic cross-sectional view illustrating the oxygen-absorbing laminate according to Embodiment 2 of the present invention.

FIG. 2 illustrates the oxygen-absorbing laminate 4 in which the gas barrier layer 5 and the base film 6 are laminated to one of the resin layers 3 of the oxygen-absorbing film 1. However, only the gas barrier film 5 or the base film 6 may be laminated to the resin layer 3.

By laminating the gas barrier film 5 and/or the base film 6 to the oxygen-absorbing film 1, not only intrusion of a gas such as oxygen can be blocked, but also the strength of the laminate itself can be improved. Examples of the gas barrier film include aluminum foils, aluminum foil-laminated films, aluminum-deposited films, alumina-deposited films, silica-deposited films and silica-alumina deposited films. The exemplary base films include PET films and nylon films.

The method of laminating the gas barrier film 5 and/or the base film 6 to the oxygen-absorbing film 1 includes a dry-laminating method or an extrusion-laminating method can be employed.

The oxygen-absorbing laminate 4 according to the present invention can be formed into a bag with the heat-sealable thermoplastic resin layer 3 facing inside so as to be used as an oxygen-absorbing packaging material of various forms, such as a four sided-sealed bag, a three sided-sealed bag, a pillow bag, a gusset pillow bag, a standing bag, a box-shaped bag, a zippered bag or a tetrahedral type sealed bag.

The present invention will now be described more concretely by the following examples.

EXAMPLES

Using a LABO PLASTOMILL mixer (manufactured by Toyo Seiki Seisaku-Sho Ltd.) or a LABO PLASTOMILL twin-screw extruder (manufactured by Toyo Seiki Seisaku-Sho Ltd.), a thermoplastic resin and oxygen-deficient cerium oxide particles (represented by the formula $CeO_{2-x}$, wherein x is 1.5) were kneaded under a nitrogen atmosphere.

As shown in Table 1, a variety of resin compositions were prepared by changing the type of the kneader, the type and amount of the thermoplastic resin (low-density polyethylene, Petrothene Series manufactured by Tosoh Corporation) and the amount of cerium oxide (Examples 1 to 14 and Comparative Examples 1 to 5).

Here, "Kneading method 1" in Table 1 indicates that a method using a LABO PLASTOMILL mixer was employed and "Kneading method 2" indicates that a method using a LABO PLASTOMILL twin-screw extruder was employed.

TABLE 1

| No. | Type of thermoplastic resin/MFR (g/10 min) | $CeO_{2-x}$ content (Wt %) | Kneading method | MFR of resin composition (g/10 min) | Film-forming property |
|---|---|---|---|---|---|
| Example 1 | Resin C/8.4 | 51 | Kneading method 1 | 5.59 | Good |
| Example 2 | Resin D/11.3 | 51 | Kneading method 1 | 8.25 | Good |
| Example 3 | Resin E/21.2 | 51 | Kneading method 1 | 17.27 | Good |
| Example 4 | Resin C/8.4 | 60 | Kneading method 1 | 4.31 | Good |
| Example 5 | Resin D/11.3 | 60 | Kneading method 1 | 6.99 | Good |
| Example 6 | Resin E/21.2 | 60 | Kneading method 1 | 13.66 | Good |
| Example 7 | Resin C/8.4 | 75 | Kneading method 1 | 2.73 | Good |
| Example 8 | Resin D/11.3 | 75 | Kneading method 1 | 3.77 | Good |
| Example 9 | Resin E/21.2 | 75 | Kneading method 1 | 7.31 | Good |
| Example 10 | Resin E/21.2 | 75 | Kneading method 2 | 4.92 | Good |
| Example 11 | Resin D/11.3 | 82 | Kneading method 1 | 1.81 | Good |
| Example 12 | Resin E/21.2 | 82 | Kneading method 1 | 1.94 | Good |
| Example 13 | Resin F/54.2 | 82 | Kneading method 1 | 2.20 | Good |
| Example 14 | Resin E/21.2 | 82 | Kneading method 2 | 4.70 | Good |
| Comparative Example 1 | Resin A/0.28 | 75 | Kneading method 1 | 0.10 | NG |
| Comparative Example 2 | Resin G/65.5 | 75 | Kneading method 1 | 22.72 | NG |
| Comparative Example 3 | Resin B/8.0 | 85 | Kneading method 1 | 0.56 | NG |
| Comparative Example 4 | Resin E/21.2 | 85 | Kneading method 1 | 0.34 | NG |
| Comparative Example 5 | Resin G/65.5 | 85 | Kneading method 1 | 0.29 | NG |

The melt flow rates (indicated as "MFR" in Table 1) of the thus obtained resin compositions were measured using a melt indexer (manufactured by Technol Seven Co., Ltd.) at a temperature of 190° C. under the conditions in accordance with JIS K7210.

The film-forming property was evaluated by the following procedure.

An oxygen-absorbing film having a three-layer structure, in which each of the thus obtained resin compositions (the resin compositions of Examples 1 to 14 and Comparative Examples 1 to 5) was used as an intermediate layer and thermoplastic resin layers were arranged as inner and outer layers, was molded. A film of 50 μm in total thickness (inner layer/oxygen-absorbing layer/outer layer=10/30/10 μm) was formed by using a multilayer inflation apparatus under nitrogen gas flow. Here, the thermoplastic resin used for the inner and outer layers was Petrothene 180 (melt flow rate=2.0, manufactured by Tosoh Corporation).

In the step of molding an oxygen-absorbing film having the three-layer structure using the multilayer inflation apparatus, the film forming property was evaluated as "Good" when the film was formed without any problem. On the other hand, when a film could not be formed stably due to, for example, inconsistent extrusion amount, breakage of the resulting film or stalling of the apparatus caused by a high torque load, the film forming property was evaluated as "NG". The results are summarized in Table 1 and the relationship between the melt flow rate of the respective resin compositions and that of the respective thermoplastic resins is depicted in the graph of FIG. 3.

Films of 30 μm in total thickness in which the inner layer, the oxygen-absorbing layer and the outer layer all have a thickness of 10 μm could also be formed stably.

Figure 3:
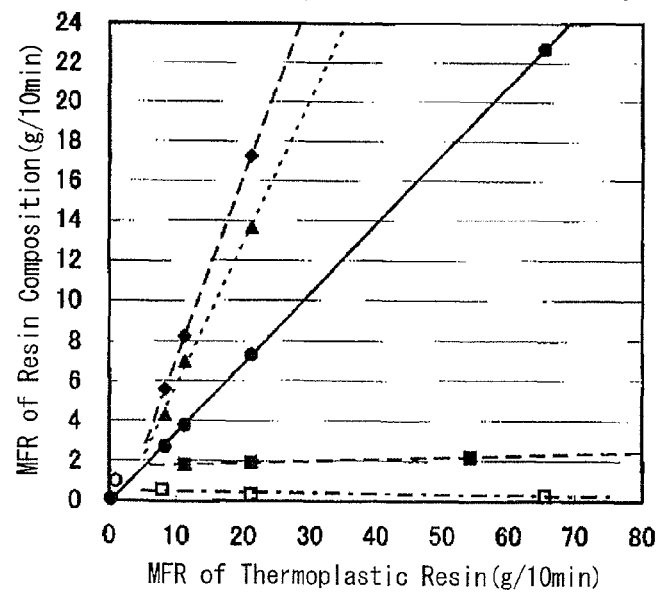
FIG. 3 is a graph illustrating the relationship between the melt flow rates of resin compositions and those of thermoplastic resins.

From Table 1 and FIG. 3, the followings can be seen:

(1) Good film forming property is attained when the resin composition contains an oxygen-deficient cerium oxide in an amount of 51% by weight to 82% by weight and has a melt flow rate in the range of 1.81 to 17.27 g/10 min; and (2) Even if a thermoplastic resin having a melt flow rate of higher than 8.0 g/10 min were used, it is difficult to form a film from a resin composition containing 85% by weight of an oxygen-deficient cerium oxide.

(Measurement of Amount of Oxygen Absorption)

Examples where the amount of oxygen absorbed by an oxygen-absorbing film or an oxygen-absorbing laminate was measured will now be described (Examples 15, 16 and Comparative Examples 6, 7).

Example 15

Using the film of Example 10, the amount of oxygen absorbed was measured by the following method.

The oxygen-absorbing film having a size of 25 cm$^2$ was placed in a bag made of PET/aluminum foil/PE and the bag was sealed in the form of a tetrahedral shape having a volume of 15 mL. That is, the tetrahedral type bag was filled with 15 mL of air. After leaving the bag at normal temperature for 30 days, the oxygen concentration in the tetrahedral type bag was measured by inserting thereinto the measuring probe of Pack Master RO-103 (membrane-separated galvanic cell-type oxygen sensor, manufactured by Iijima Electronics Corporation) and the amount of oxygen absorbed by the oxygen-absorbing film was calculated.

Example 16

A 9 μm-thick aluminum foil (aluminum alloy foil, manufactured by Sumikei Aluminum Foil Co., Ltd.) was dry-laminated to a 12 μm-thick PET film (E5100, manufactured by Toyobo Co., Ltd.). Then, the oxygen-absorbing film of Example 10 was further dry-laminated to the aluminum foil to prepare an oxygen-absorbing laminate.

The amount of oxygen absorbed by the thus obtained oxygen-absorbing laminate was measured in the same manner as in Example 15.

Comparative Examples 6 and 7

For oxygen-absorbing films whose oxygen-absorbing layer contained an oxygen-deficient cerium oxide at a ratio of 20% by weight or 40% by weight (the thermoplastic resin of the oxygen-absorbing layer and the resins arranged on both sides thereof were all Petrothene 180, manufactured by Tosoh Corporation; the thickness of the respective layers was 10 μm/30 μm/10 μm), the amount of oxygen absorbed was measured in the same manner as in Example 15. It is noted here that the kneading method 1 was employed for kneading of cerium oxide and the thermoplastic resin and that the oxygen-absorbing films were molded in the same manner as in Example 1.

The measurement results for the amount of oxygen absorbed by the respective films or laminates of Examples 15, 16 and Comparative Examples 6, 7 are shown in Table 2.

TABLE 2

| No. | Film No. | $CeO_{2-x}$ content of oxygen-absorbing layer (wt %) | Amount of oxygen absorbed |
|---|---|---|---|
| Example 15 | Film of Example 10 | 75 | 0.047 mL/cm$^2$ |
| Example 16 | Oxygen-absorbing laminate (PET12//AL9//Film of Example 10) | 75 | 0.045 mL/cm$^2$ |
| Comparative Example 6 | — | 40 | 0.023 mL/cm$^2$ |
| Comparative Example 7 | — | 20 | 0.012 mL/cm$^2$ |

The higher the content of the oxygen-deficient cerium oxide in the oxygen-absorbing layer, the greater was the amount of oxygen absorbed.

(Measurement of Amount of Oxygen Absorbed by Oxygen-Absorbing Packaging Material)

Examples where the amount of oxygen absorbed by a bag made of packaging material formed from an oxygen-absorbing laminate was measured will now be described as follows.

Example 17

A four side-sealed bag with an internal dimension of 125 mm×65 mm having inner surface made of the oxygen-absorbing laminate of Example 16 (PET12//AL9//film of Example 10) is prepared such that the resulting oxygen-absorbing packaging material had a volume of 35 mL, that is, the bag was filled with 35 mL of air.

After leaving the four side-sealed bag for 30 days, the oxygen concentration therein was measured by inserting the measuring probe of Pack Master RO-103 (membrane-separated galvanic cell-type oxygen sensor, manufactured by Iijima Electronics Corporation). As a result, the oxygen concentration was measured to be 0.20%.

Comparative Example 8

Film Formation Using Resin Composition Comprising Thermoplastic Resin Having Melt Flow Rate Recommended by Resin Manufacturer as Suitable for Film Formation Using thermoplastic resins having a melt flow rate recommended as suitable for film formation, 4.0 g/10 min or 8.0 g/10 min, as base materials, resin compositions containing an oxygen-deficient cerium oxide in an amount of 50% by weight were prepared and film formation was attempted with the thus obtained resin compositions. However, stable film formation could not be carried out with neither of the resin compositions, so that a film could not be obtained.

DESCRIPTION OF SYMBOLS

1: Oxygen-absorbing film
2: Oxygen-absorbing layer
3: Thermoplastic resin layer
4: Oxygen-absorbing laminate
5: Gas barrier film
6: Base film

The invention claimed is:

1. An oxygen-absorbing film, comprising:
an oxygen-absorbing layer comprising a thermoplastic resin and an oxygen-deficient cerium oxide; and
resin layers arranged on both sides of the oxygen-absorbing layer,
wherein the oxygen-absorbing layer comprises the oxygen-deficient cerium oxide in an amount of more than 50% by weight to less than 85% by weight and has a melt flow rate in the range of 1.0 to 18.0 g/10 min;
wherein the thermoplastic resin in the oxygen-absorbing layer has a melt flow rate within a range of more than 8.0 to no more than 55.0 g/10 min.

2. The oxygen-absorbing film according to claim 1, wherein the content of the oxygen-deficient cerium oxide is in the range of 51% by weight to 82% by weight.

3. The oxygen-absorbing film according to claim 1, wherein the content of the oxygen-deficient cerium oxide is higher than 60% by weight and equal to or lower than 85% by weight.

4. The oxygen-absorbing film according to claim 1, wherein the resin layers arranged on both sides of the oxygen-absorbing layer have a melt flow rate in the range of 0.3 to 8.0 g/10 min.

5. The oxygen-absorbing film according to claim 1, wherein the oxygen-absorbing film is obtainable by arranging the resin layers arranged on both sides of the oxygen-absorbing layer using a multilayer inflation apparatus.

6. An oxygen-absorbing laminate, wherein a gas barrier film and/or a base film is/are laminated to the oxygen-absorbing film according to claim 1.

7. An oxygen-absorbing packaging material, which is obtained by forming the oxygen-absorbing laminate according to claim 6 into a bag.

8. A resin composition, which comprises:
a thermoplastic resin; and
an oxygen-deficient cerium oxide,
wherein the content of the oxygen-deficient cerium oxide is higher than 50% by weight to less than 85% by weight and said resin composition has a melt flow rate in the range of 1.0 to 18.0 g/10 min;
wherein the thermoplastic resin has a melt flow rate within a range of more than 8.0 to no more than 55.0 g/10 min.

9. The resin composition according to claim 8, characterized in that the content of the oxygen-deficient cerium oxide is in the range of 51% by weight to 82% by weight.

10. The resin composition according to claim 8, characterized in that the content of the oxygen-deficient cerium oxide is higher than 60% by weight and equal to or lower than 85% by weight.

11. Method for producing the oxygen-absorbing film according to claim 5, characterized in that the method comprises:
kneading a thermoplastic resin and an oxygen-deficient cerium oxide to obtain a resin composition which comprises a thermoplastic resin and an oxygen-deficient cerium oxide, wherein the content of the oxygen-deficient cerium oxide is higher than 50% by weight to less than 85% by weight and said resin composition has a melt flow rate in the range of 1.0 to 18.0 g/10 min, characterized in that the thermoplastic resin has a melt flow rate higher than 8.0 and equal to or lower than 55.0 g/10 min; and
forming the oxygen-absorbing film by arranging resin layers arranged on both sides of an oxygen-absorbing layer, using a multilayer inflation apparatus, wherein the oxygen-absorbing layer is obtained from the resin composition.

12. The oxygen-absorbing film according to claim 5, wherein the thermoplastic resin in the oxygen-absorbing layer has a melt flow rate higher than 8.2 and equal to or lower than 55.0 g/10 min.

* * * * *